United States Patent
Tonini et al.

(10) Patent No.: US 11,724,557 B2
(45) Date of Patent: Aug. 15, 2023

(54) ASSEMBLY FOR A HYDRAULICALLY SUSPENDED VEHICLE AXLE

(71) Applicant: Dana Italia S.r.l., Trento (IT)

(72) Inventors: Daniele Tonini, Trento (IT); Federico Bavaresco, Trento (IT); Stefano Fasano, Emilia (IT); Alessandro Benevelli, Emilia (IT)

(73) Assignee: Dana Italia S.R.L., Arco (IT)

( * ) Notice: Subject to any disclaimer, the term of this patent is extended or adjusted under 35 U.S.C. 154(b) by 0 days.

(21) Appl. No.: 17/653,673

(22) Filed: Mar. 7, 2022

(65) Prior Publication Data

US 2022/0288992 A1    Sep. 15, 2022

(30) Foreign Application Priority Data

Mar. 10, 2021   (DE) ..................... 20 2021 101 206.4

(51) Int. Cl.
*B60G 21/073*    (2006.01)

(52) U.S. Cl.
CPC ........ *B60G 21/073* (2013.01); *B60G 2200/20* (2013.01); *B60G 2202/154* (2013.01); *B60G 2202/24* (2013.01); *B60G 2202/413* (2013.01)

(58) Field of Classification Search
CPC .............. B60G 21/073; B60G 2200/20; B60G 2202/154; B60G 2202/24; B60G 2202/413; B60G 2202/416; B60B 35/16; B60B 35/004
See application file for complete search history.

(56) References Cited

U.S. PATENT DOCUMENTS

| 3,563,566 | A | * | 2/1971 | Weber | B60G 21/073 280/124.112 |
| 3,572,746 | A | * | 3/1971 | Mueller | B60G 21/073 280/124.112 |
| 3,717,355 | A | * | 2/1973 | De Mars | B60G 21/06 280/124.102 |
| 4,606,551 | A | * | 8/1986 | Toti | B60G 21/06 280/124.161 |
| 5,794,966 | A | * | 8/1998 | MacLeod | B60G 21/073 280/5.507 |
| 5,931,486 | A | * | 8/1999 | Andreis | B60G 3/20 180/905 |
| 6,308,973 | B1 | * | 10/2001 | Griebel | B60G 17/0152 280/124.159 |
| 8,960,697 | B2 | * | 2/2015 | Kato | B60G 21/073 280/5.506 |
| 11,511,583 | B2 | * | 11/2022 | Waerstad | B60G 21/073 |
| 11,598,352 | B2 | * | 3/2023 | Frommelt | F15B 13/02 |

(Continued)

FOREIGN PATENT DOCUMENTS

DE   102010014185 A1   1/2011
EP         2801737 A1 * 11/2014   ............ F16H 48/00

(Continued)

*Primary Examiner* — Paul N Dickson
*Assistant Examiner* — Tiffany L Webb
(74) *Attorney, Agent, or Firm* — Marshall & Melhorn, LLC

(57) ABSTRACT

An assembly for a hydraulically suspended vehicle axle may have a central housing, and at least two hydraulic suspension components supported on the central housing and fluidly connected to one another by a fluid line extending at least partially through the central housing.

11 Claims, 5 Drawing Sheets

(56) References Cited

U.S. PATENT DOCUMENTS

| | | | | |
|---|---|---|---|---|
| 2006/0192361 A1* | 8/2006 | Anderson | ........ | B60G 17/0195 |
| | | | | 280/124.16 |
| 2012/0217793 A1* | 8/2012 | Drum | ...................... | B60B 35/16 |
| | | | | 301/124.1 |
| 2014/0069230 A1* | 3/2014 | Trost | .................. | F16H 57/0483 |
| | | | | 74/607 |
| 2020/0108706 A1* | 4/2020 | Devreese | ................ | B60B 35/14 |
| 2022/0324256 A1* | 10/2022 | Hurd | .................. | F16H 57/0416 |

FOREIGN PATENT DOCUMENTS

| EP | 3626485 | A1 | | 3/2020 | | |
|---|---|---|---|---|---|---|
| ES | 2354154 | T3 | | 3/2011 | | |
| WO | WO-2016166161 | A1 | * | 10/2016 | ......... | B60G 17/0416 |

\* cited by examiner

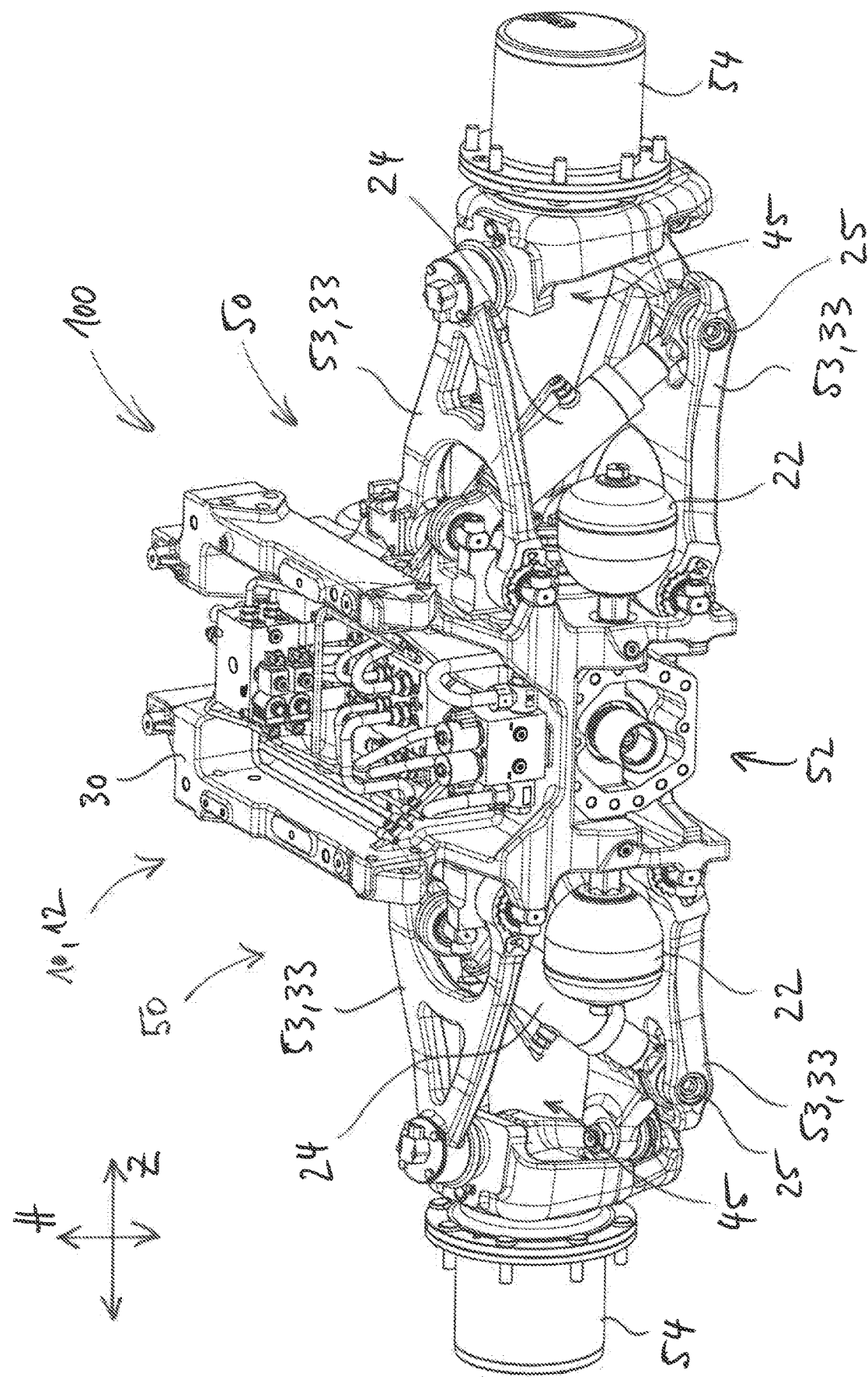

ASSEMBLY FOR A HYDRAULICALLY SUSPENDED VEHICLE AXLE

FIELD

The present disclosure relates to an assembly for a hydraulically suspended vehicle axle, a central housing for such an assembly and to a hydraulically suspended vehicle axle including said assembly.

BACKGROUND

Hydraulic suspension systems for vehicle axles are known in the prior art, e.g. to adjust handling performance characteristics or to generally improve ride comfort. Typically, they include a valve arrangement for selectively channeling fluid into or out of a suspension actuator, such as a suspension cylinder. The actuator may support an axle member connected to a wheel with respect to a vehicle frame, e.g. by forming an at least indirect mechanical connection therebetween. By regulating the hydraulic fluid volume and/or the hydraulic pressure within the actuator, damping and/or spring characteristics of the suspension can be set.

Components of the hydraulic suspension system, such as the above valve arrangements, fluid accumulators connected thereto or an optional fluid pressure source such as a pump are typically connected to the actuators by a fluid line arrangement. According to established design choices, however, these components are often spaced far apart from one another. For example, the valve arrangements and accumulators may be positioned remotely from the vehicle axle and close to e.g. a central hydraulic pump of the vehicle. This may complicate assembly. For example, when the vehicle axle is configured as a preassembled part, its hydraulic suspension components have to be fixed at various positions remote from the axle which may increase the number assembly steps. Further, a fluid line arrangement for connecting components may have an increased length which may increase production costs and/or pressure losses.

It is an object of the present disclosure to provide a hydraulic suspension for a vehicle axle with an improved efficiency and a simplified assembly procedure.

SUMMARY

This object is solved by an assembly, a central housing of such an assembly and a vehicle axle according to the attached independent claims. Special embodiments are defined in the dependent claims.

Specifically, an assembly for a hydraulically suspended vehicle axle is disclosed, the assembly comprising: a central housing and at least two hydraulic suspension components supported on or by the central housing and fluidly connected to one another by a fluid line extending or at least partially extending through the central housing.

By arranging or supporting the hydraulic suspension components on the central housing and/or by directly securing or connecting them thereto, it may not be necessary to secure said components to any other part of the vehicle. Thus, when connecting the assembly (or an axle comprising said assembly) to a vehicle, the number of required assembly steps may be reduced as the hydraulic components usually do not need to be additionally fixed directly to the vehicle.

Further, by arranging or connecting the hydraulic suspension components on or to the central housing, a distance between them may be reduced, thereby reducing pressure losses. Connecting these components with a fluid line that extends through or at least partially through the housing usually increases space efficiency. Also, this fluid line is at least partially protected by the housing e.g. compared to a fluid line running externally and unprotected along a vehicle frame.

The vehicle for which the axle is designed may be a heavy duty vehicle and/or an agricultural or industrial vehicle. In other embodiments, the vehicle may be a light or medium duty commercial vehicle or a passenger vehicle.

The vehicle axle may e.g. be a front or a rear axle. It may be connectable to or, differently put, it may be configured to support at least two wheels of the vehicle, said wheels being typically disposed at different sides of the vehicle (e.g. a right and left side).

The vehicle axle may be a steerable and/or a driven axle. Additionally or alternatively, the hydraulic suspension may be part of or provide an independent suspension wherein each wheel attached to the axle may be independently suspended (e.g. each wheel may be individually damped and/or may move independently of the other wheel in a vertical direction). The disclosed solution is not limited to an independent suspension but may equally be provided in connection with a dependent suspension that e.g. comprises a rigid axle.

Generally, the vehicle axle may be configured as a preassembled part that is e.g. delivered to a final assembly line of a vehicle factory. Accordingly, the disclosed assembly may be part of a respectively preassembled vehicle axle and, as a part thereof, be attachable to e.g. a vehicle frame in a final vehicle assembly line. The vehicle frame may be an elongated structure supporting e.g. at least one vehicle axle, a driver's cab (or passenger cabin) and/or an engine.

Hydraulically suspending the vehicle axle may comprise that at least one suspension characteristic of the vehicle axle is set using a hydraulic system (or hydraulic volume) and/or the at least two hydraulic suspension components. For doing so, pressures and/or hydraulic volumes within a hydraulic suspension system may be adjusted by means of said components.

The central housing may comprise or may be formed of a metallic material. In one embodiment, the central housing is a cast part, e.g. produced by metal casting such as by aluminium casting.

The central housing may be connectable to a vehicle frame or vehicle chassis. It may further be configured to support axle members and in particular axle members supporting wheels of the vehicle, such as suspension control arms, axle shafts or wheel carriers. The central housing may be central in a sense that it is disposed between and in particular substantially in the middle of the wheels of the axle. As detailed below, the central housing may be configured to house further components of the axle and/or the vehicle, such as driveshafts or gear assemblies (e.g. an axle differential). For doing so, the central housing may be configured with a hollow space and/or a recess for at least partially surrounding such components.

The hydraulic components may be mechanically fixed to the central housing, e.g. by means of screws or bolts. For example, the hydraulic components may not be fixed to any other vehicle components or generally to any vehicle components outside of the vehicle axle or the assembly disclosed herein. This way, the hydraulic components may be secured to the central housing during a pre-assembly and e.g. be delivered together with the central housing and/or a vehicle axle comprising said housing.

For example, the hydraulic suspension components may be rigidly connected to the central housing. Differently put, they may be non-movable relative thereto and/or may be mechanically secured thereat.

The fluidic connection between said components may at least partially be formed by a distinct fluid line member, e.g. a hose or pipe that extends through the central housing e.g. by being inserted or guided through said housing). This may include providing a channel, through hole or bore for accommodating said fluid line member. These structures may e.g. be formed directly during casting of the central housing or may subsequently be produced after casting. The optional fluid line member may be guided through said structures, wherein the central housing provides a guiding and/or stabilising effect.

Usually, there is no separate fluid line member inserted into the central housing, but said fluid line is directly formed within and/or integrated into the central housing. For example, any of the above structures and in particular a channel may extend within and through the central housing e.g. from one side to another. At at least one end portion of the channel (that e.g. opens to an outside) mechanical interfaces may be provided to which the hydraulic components and/or pipes or hoses leading to said components may be connected.

Accordingly, the hydraulic fluid may directly flow through the integrated fluid line in the central housing and/or come into contact therewith. Differently put, the central housing may form at least a section of a fluidic connection between the hydraulic components. This may help to reduce part numbers as the number of separate pipes or hoses can be limited. Also, the fluidic connection between the components is protected by the typically stiff and large structure of the central housing.

At least a section of the fluid line may be formed by the central housing.

At least one of the hydraulic suspension components may include or be configured as a hydraulic valve. For example, the hydraulic suspension component may be a valve block comprising at least one (typically electronically controlled) valve. The valve may be a manifold comprising a number of single valve units and/or being configured to distribute fluid to a number of further hydraulic components.

Additionally or alternatively, at least one of the hydraulic suspension components may include (or may be configured as) an accumulator. The accumulator may act as a storage reservoir for hydraulic fluid and in particular for pressurised fluid. For doing so, it may comprise a housing and/or an interior chamber for storing hydraulic fluid. In a generally known manner, the accumulators may be selectively connected to e.g. a hydraulic suspension actuator, such as a hydraulic piston (e.g. a damping- and/or spring-piston), to receive hydraulic fluid therefrom or provide hydraulic fluid thereto.

The fluid line extending through the housing may fluidically connect an accumulator and at least one valve and/or a manifold comprising a valve unit. This may be particularly advantageous as these components may thus be positioned close to one another, for example on different sides of the housing. This may limit the length of the fluid line and may provide a space efficient design.

In one embodiment, at least a first valve and at least one accumulator may be provided as hydraulic components. These may form a hydraulic damping unit of the suspension. For example, they may be fluidically connected to one another by the fluid line extending through the central housing. They may also be connected to hydraulic chambers (e.g. a piston chamber or a rod chamber) of a least one suspension actuator, such as a hydraulic cylinder. In case of the suspension comprising a pair of respective cylinders (e.g. one for each wheel), four respective hydraulic damping units may be provided. For example, at least two of these units may comprise hydraulic components that are connected by a fluid line extending through the central housing.

The assembly may further comprise a suspension cylinder (also referred to as a suspension actuator herein) that is fluidly connected or selectively fluidly connected to one or both of the hydraulic suspension components. Optionally, said fluidic connection may be formed by the disclosed fluid line extending through the central housing. The suspension cylinder may provide a defined spring and/or damping resistance to vertical movements of at least one wheel of the axle. In a generally known manner, it may comprise at least one chamber (e.g. a piston or rod chamber) for accommodating hydraulic fluid. The pressure in said chamber may be regulated to adjust the suspension characteristics of the suspension cylinder.

In one embodiment, at least one damping unit of the above-described type may be fluidly connected to one chamber of the suspension cylinder. Two damping units may be provided per suspension cylinder (and normally one respective cylinder per wheel), wherein a first damping unit may be fluidly connected to a piston chamber and a second damping unit may be fluidly connected to a rod chamber of the suspension cylinder. It is also possible that one damping unit is connected to chambers of two different suspension cylinders, so that e.g. only two or three damping units may be provided overall.

The assembly may further comprise a suspension control arm that is pivotally connected to the central housing, wherein a first end of the suspension cylinder is connected to or supported on the central housing and a second end of the suspension cylinder is connected to or supported on the suspension control arm.

Alternatively, the assembly may comprise a rigid axle pivotally connected to the central housing, wherein a first end of the suspension cylinder is connected to or supported on the central housing and a second end of the suspension cylinder is connected to or supported on the rigid axle.

In both of the above cases (i.e., suspension control arm and rigid axle), the first end may, as an alternative, be connected to or supported on a vehicle frame or on another vehicle part relative to which the control arm may move.

Generally, with respect to a forward driving direction of the vehicle, the central housing may have a front side (facing in said forward driving direction and/or being positioned in front) and a rear side (facing in the opposite/rearward direction and/or being positioned at the rear). Also, the central housing may have bottom face (or underside) facing the vehicle's underground and a top face (or upper side) facing towards the vehicle (e.g. towards the vehicle's frame). Further, the central housing may have a right and left side each facing a wheel attached to the axle.

According to a further aspect, the hydraulic suspension components are arranged at different sides of the central housing, said sides e.g. being any of the above sides. For example, the different sides may be the bottom face and top face or top face and a left or right side, with any other combination being possible as well.

This opens up large degrees of freedom with respect to component placement and/or may help to improve compactness of the assembly. In this context, the disclosed fluid line extending through the central housing may provide a space-efficient fluidic connection between the components by providing a channel between the different sides.

According to a further embodiment, the central housing has, with respect to a forward driving direction of the vehicle, a front section and a rear section (e.g. comprising the respective one of the front or rear face), wherein both hydraulic components are arranged within one of the front section and the rear section (and/or arranged close to or at one of the front or rear face). This may include that the fluid line extending through the central housing is likewise located within the respective front or rear section (or at the respective front or rear face).

By placing the components close to one another and e.g. both within the front or rear section, a length of the fluid line may be limited which reduces pressure losses. Limiting said length also helps to limit the need for regions of the central housing having a certain minimal wall thickness (i.e. so that the fluid line may be formed therein). Differently put, limiting said length limits the region in which the central housing could be structurally weakened by the fluid line, e.g. so that a wall thickness has to be locally increased as a countermeasure.

According to a further embodiment, a mechanical interface for connecting to a suspension control arm is provided on at least one side of the central housing. At least one of the hydraulic components may be arranged on said same side. The hydraulic component may be an accumulator that is connected by the fluid line to e.g. a valve unit at another side of the central housing. Again, the above placement at a common side may help to improve compactness of the assembly and may be enabled by the fluid line extending through the central housing (e.g. compared to an external pipe guided along the housing which could represent an obstacle for the control arm's movements).

The mechanical interface may be configured to provide a mechanical connection between the central housing and the control arm, e.g. by receiving a bolt, joint, screw or the like. Accordingly, the mechanical interface may e.g. comprise at least one through-hole, at least one mounting lug or at least one recess for e.g. receiving a joint or bearing.

When viewed along a vertical axis or height axis of the vehicle, the hydraulic component may be positioned at a lower or larger height compared to the control arm. In case a pair of control arms is provided (e.g. one respective pair per wheel and/or side of the central housing), the hydraulic component may be positioned at a height position between the control arms. Also, it may at least partially be arranged or received between said control arms, e.g. when additionally viewed along a horizontal axis.

According to a further embodiment, the central housing may receive and/or at least partially surround a vehicle component. For example, the assembly may further comprise an axle differential that is disposed within or at least partially disposed within the central housing. Additionally or alternatively, the assembly may further comprise a drive shaft that is disposed within or at least partially disposed within the central housing. Using a correspondingly configured central housing also as a carrier for the hydraulic components and further providing a fluid line extending through the central housing, may provide a high degree of compactness and efficiency, for example.

The present disclosure further relates to a hydraulically suspended vehicle axle, comprising:
an assembly according to any one of the aspects disclosed herein;
at least one suspension link member (and in particular a suspension control arm or rigid axle) connected to the central housing of the assembly and e.g. configured to being connected to at least one wheel.

For example two suspension link members may be provided (e.g. two suspension control arms), wherein a first suspension link member is connected to a first side of the central housing and a second suspension link member is connected to a second side of the central housing, wherein the first and second side face away from one another. Said suspension link members may each be connected or connectable to a wheel, e.g. the first suspension link member to first wheel and the second suspension link member to a second wheel. Thus, an axle with independent suspension may be formed.

Alternatively, the suspension link member may be a rigid axle that is connected or connectable to at least two wheels of the axle. Said single suspension link member may be pivotally coupled to the central housing.

The present disclosure also relates to a central housing for forming an assembly according to any of the aspects disclosed herein

DESCRIPTION OF THE FIGURES

Embodiments of the presently proposed assembly, central housing and vehicle suspension system are described in the following with reference to the attached schematic drawings. Same features may be marked with same reference signs throughout the figures.

FIG. 5 shows a vehicle axle comprising the assembly according to FIG. 2.

DETAILED DESCRIPTION

Figure 1:
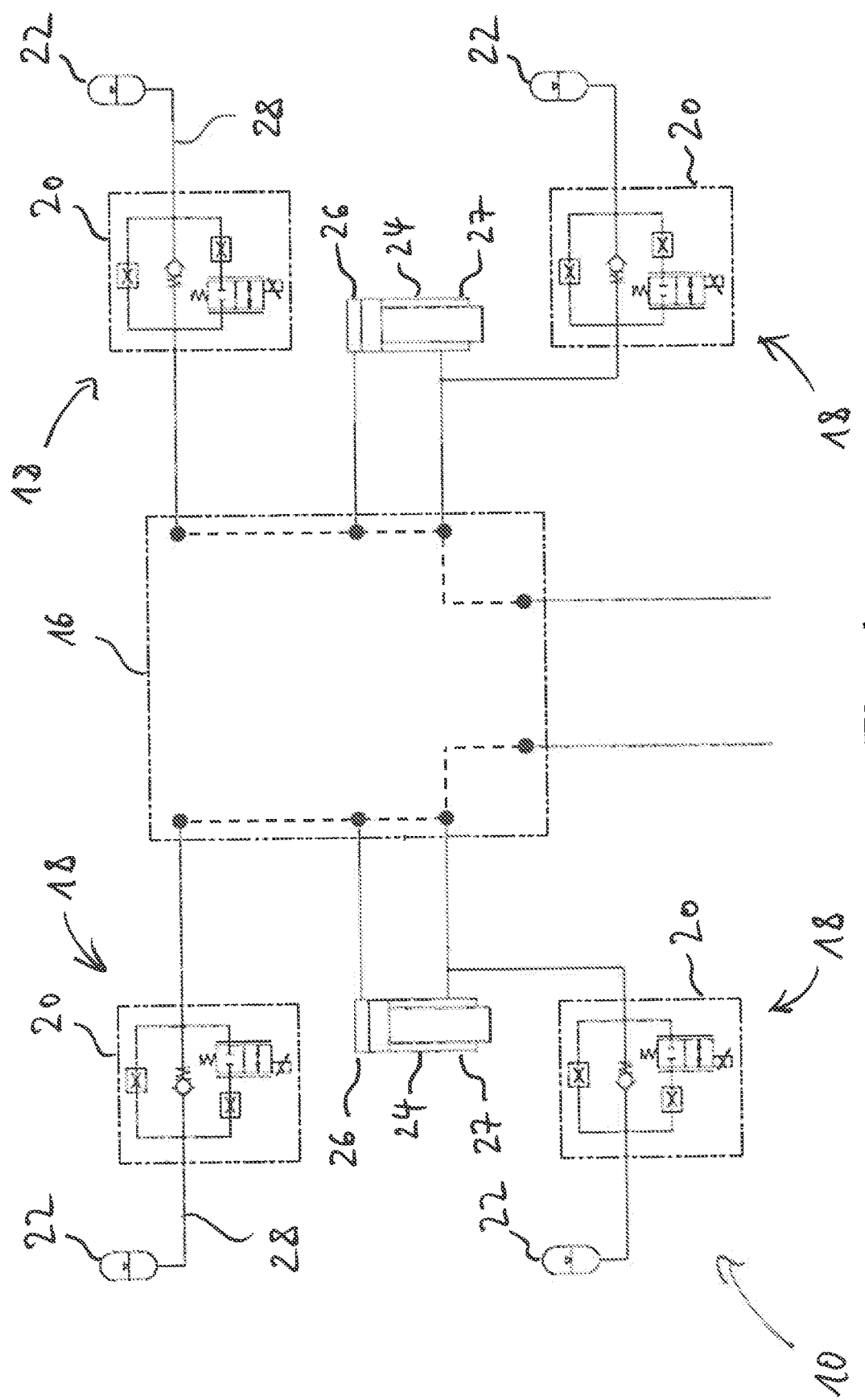
FIG. 1 schematically shows a circuit diagram of an assembly of the presently proposed type.

FIG. 1 schematically depicts a circuit diagram of a hydraulic suspension system 10 comprised by an embodiment of an assembly 12 of the presently proposed type. The assembly 12 is comprised by a vehicle axle 100 that is discussed below with reference to FIG. 5. Here and in all of the following, features recurring in different figures are designated with the same reference signs.

The hydraulic suspension system 10 comprises two hydraulic suspension cylinders 24 that are each connected to non-illustrated suspension control arms of the vehicle axle 100 (see FIG. 5 for further details). The suspension cylinders 24 are also connected to a non-illustrated central housing 30 of the axle 100 and assembly 12 (see FIG. 2).

The hydraulic suspension system 10 comprises a central valve unit 16 that includes a number of single valves (not illustrated). The valve unit 16, which may likewise be referred to as a manifold, is connected to a non-illustrated hydraulic pressure source such as a pump. The valve unit 16 may be subdivided into a number of single valve blocks and/or may generally be an assembly including a plurality of single valve blocks. Also, there may be a plurality of respective valve units. The exact configuration of the valve unit 16 is not a central subject of the presently disclosed solution.

The hydraulic suspension system 10 also comprises a number of damping units 18. Said damping units 18 each comprise a damping valve 20 and an accumulator 22. By means of the damping valve 20, a hydraulic volume within the accumulator 22 may be adjusted. Generally, the damping units 18 may be configured according to known systems and may provide known functions.

In the embodiment depicted here, each damping unit 18 is connected to a hydraulic chamber 26, 27 of one of the suspension cylinders 24. More precisely, each rod chamber 27 and piston chamber 26 of a suspension cylinder 24 is connected to one of the damping units 18. Suspension characteristics of the suspension cylinders 14 and of the hydraulic suspension system 10 may be adjusted in a generally known manner.

As indicated by dotted lines, the hydraulic connections between the damping units 18 and the piston chambers 26, 27 extend through and/or are at least partially provided by the valve unit 16. In the merely schematic illustration of FIG. 1, the interior configuration of the valve unit 16, which does not form a central part of the disclosed solution, is not specifically illustrated. Accordingly, the hydraulic connections within the valve unit 16 may comprise various valves to only selectively connect the damping unit 18 to the chambers 26, 27 and/or to a non-illustrated hydraulic pressure source.

Returning to the damping unit 18 and, in the illustrated embodiment to the left and right upper damping units 18, a fluid connection between the accumulators 22 and the damping valves 20 is formed by a fluid line 28. In the illustrated embodiment and as further shown in FIGS. 2-5, it is this fluid line 28 that extends at least partially through and that may be formed by and/or that may be integrated in a central housing 30 of the assembly 12.

Figure 2:
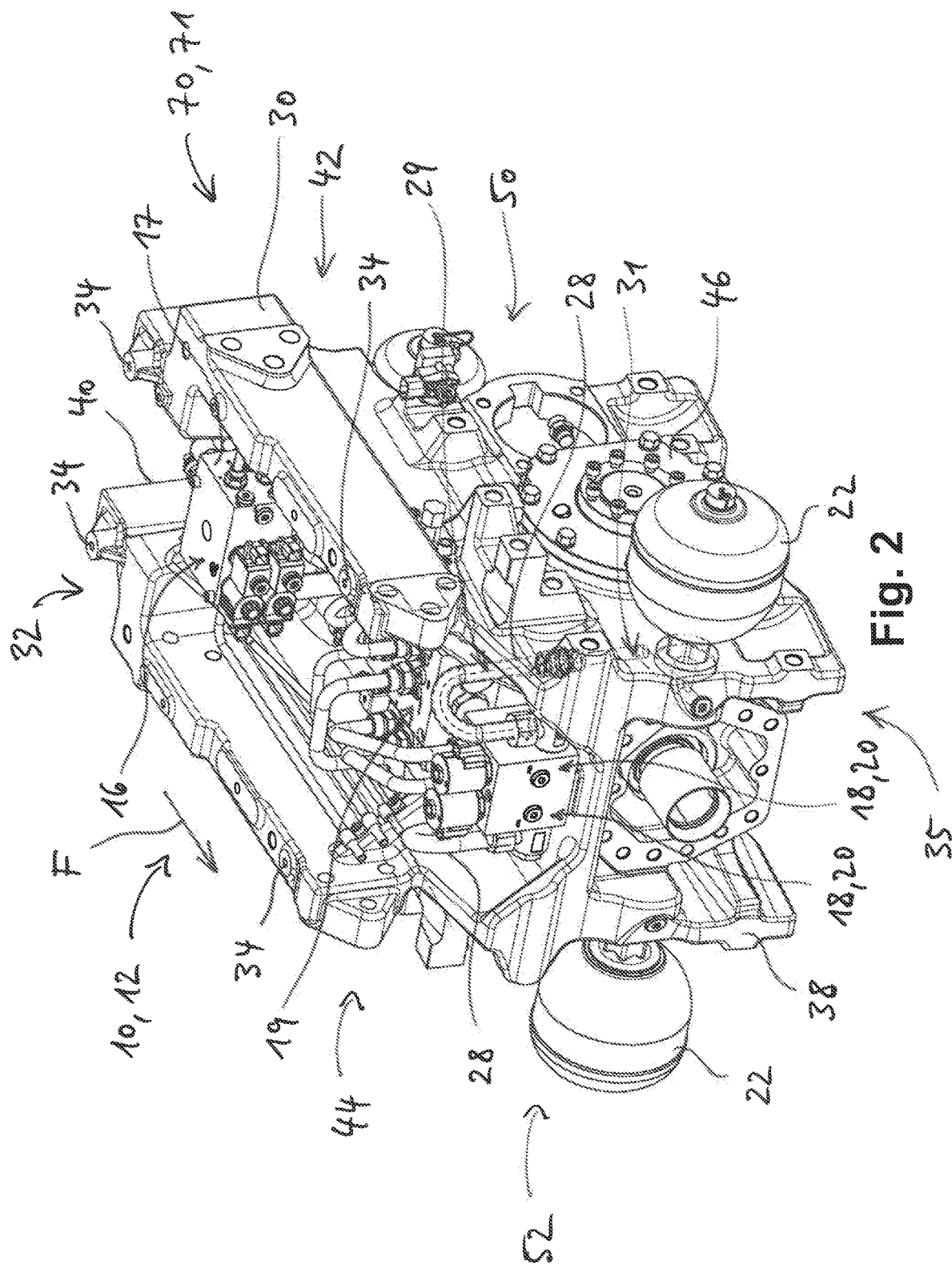
FIG. 2 shows a perspective view of the assembly schematically illustrated in FIG. 1.

Referring to FIG. 2 in the following, a perspective view of the assembly 12 comprising the hydraulic suspension system 10 is shown. The assembly 12 comprises the central housing 30 which may be a one-piece metallic structure produced by casting. The central housing 30 has an upper side 32 which comprises bolt holes 34 for fixing the central housing 30 to an underside of a non-depicted vehicle frame. An underside 35 of the central housing 30 facing away from the viewer faces an underground of the vehicle. A frontside 38 faces in a forward driving direction F whereas a rear side 40 is oriented oppositely thereto. Still further, side faces 42, 44 face towards non-depicted wheels.

The central housing 30 is configured to house a driveshaft 70 and an axle differential 71 of the vehicle, both of which are hidden from view in FIG. 2. The driveshaft 70 comprises driving interfaces 46 extending through apertures in each side face 42, 44 (see FIG. 3) for connecting to axle shafts 45 (indicated in FIG. 5) each of which may drive a vehicle wheel.

Figure 3:
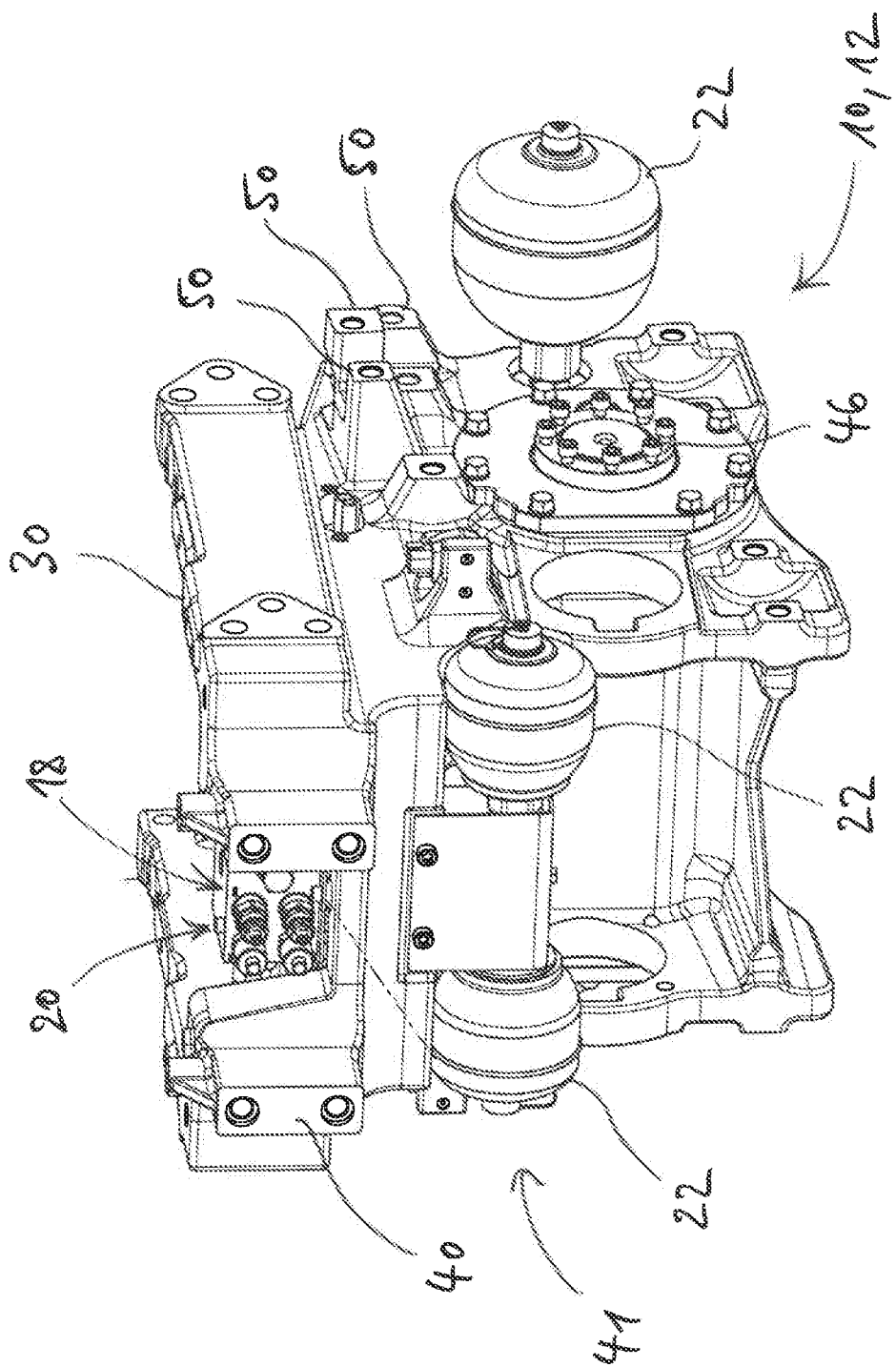
FIG. 3 shows a partial sectional view of the assembly of FIG. 2 to illustrate an integrated fluid line.

As is further evident from FIGS. 2 and 3, a number of mechanical interfaces 50 (not each of which is marked with a distinct reference sign) is provided at each side face 42, 44. As a mere example, these are formed as projections with bolt holes. The mechanical interfaces 50 allow connecting suspension components such as one end 27 of a suspension cylinder 24 or a suspension control arm 53 thereto (see FIG. 5).

In the following, the arrangement of the hydraulic suspension system 12 at the central housing 30 is discussed. The valve unit 16 is fixed to the top side 34 and in the illustrated embodiment to a recessed portion of the central housing 30. The depicted valve unit 16 comprises two separate blocks 17, 19 which, however, is merely optional.

The upper two damping units 20 shown in FIG. 2 are arranged at a front section 52 of the central housing 30 near the front side 38. More precisely, both damping valves 20 of said damping units 18 are fixed to the top side 34 of the central housing 30, whereas the accumulators 22 are rigidly connected to the side faces 42, 44 (one per respective side face 42, 44).

Figure 4:
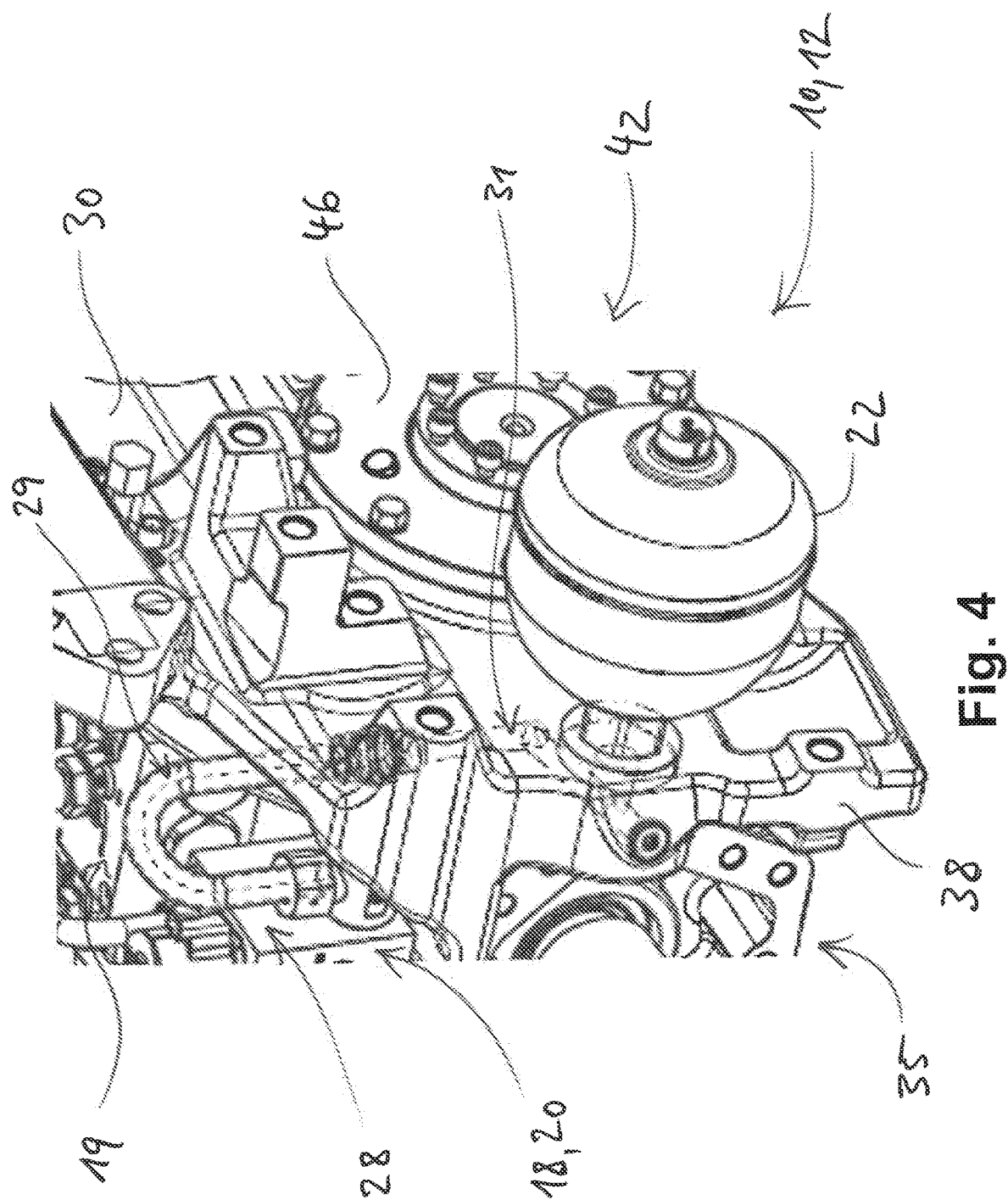
FIG. 4 shows a detail of the assembly of FIG. 2.

As is further evident from the sectional view of FIG. 4, the fluid line 28 connecting each damping valve 20 to an accumulator 22 comprises a first pipe section 29 extending between the damping valve 20 an the central housing 30. Further, a section 31 of the fluid line 28 extends through the central housing 30 and fluidly connects the pipe section 29 to the accumulator 22. The section 31 is integrally formed within and thus confined and shaped by the central housing 30. In this way, the hydraulic fluid flows directly through the central housing 30 and comes into contact therewith. Note that the fluid line 28 of the adjacent damping unit 18, which is not depicted in FIG. 4, may be configured in the same manner or in a similar manner.

Referring to FIG. 3, a view on the rear face 40 of the central housing 30 is shown. At said face 40 (i.e. in a rear section 41 of the central housing 30), the lower damping units 20 of FIG. 1 are positioned. The damping valves 18 are again positioned at the upper side 32 but could also be integrated in the block 19 to which the accumulators 22 are attached. In this latter case, a fluid line connecting the accumulators 22 and damping valves 20 may directly be formed in the block 19. When said damping valves 20 are positioned at the upper side 32 of the central housing 30, pipes that are guided along the outside of the central housing 30 may be connected to the block 19 to provide the fluid line. However, there may also be a section 31 of the fluid line extending through the central housing 30 as detailed above.

FIG. 5 depicts a vehicle axle 100 comprising the assembly 12 according to FIGS. 2-4. The vehicle axle 100 comprises control arms 53, driven axle shafts 45 as well as wheel carriers 54. The control arms 53 are attached to the mechanical interfaces 46 of the central housing 30 and to second ends 25 of the suspension cylinders 24.

As a mere example, each wheel carrier 54 is supported by two respective control arms 53, said control arms 53 being examples of suspension link members 33. When viewed along a height axis H, the accumulators 22 at the front section 52 of the central housing 30 are positioned between the control arms 53. An overlap between the control arms 53 and said accumulators 22 may also be present when viewed along a longitudinal axis L (corresponding to a horizontal axis). Differently put, said accumulators 22 may at least partially be positioned within a space that extends between the control arms 53. This provides a particularly space-efficient design and places the accumulators 22 and damping valves 20 close to one another which limits pressure losses.

What is claimed:

1. An assembly for a hydraulically suspended vehicle axle, the assembly comprising:
   a central housing,
   at least two hydraulic suspension components supported on the central housing and fluidly connected to one another by a fluid line extending at least partially through the central housing, and wherein at least a section of said fluid line is formed by said central housing, and
   wherein a mechanical interface for connecting a suspension arm is provided on at least one side of the central housing, and in that at least one of the hydraulic components is arranged on said same side.

2. The assembly according to claim 1, wherein the hydraulic suspension components are rigidly connected to the central housing.

3. The assembly according to claim 1, wherein at least one of the hydraulic suspension components includes a valve.

4. The assembly according to claim 1, wherein at least one of the hydraulic suspension components includes an accumulator.

5. The assembly according to claim 1, further comprising a suspension cylinder fluidly connected or selectively fluidly connected to one or both of the hydraulic suspension components.

6. The assembly according to claim 5, further comprising the suspension control arm pivotally connected to the central housing, wherein a first end of the suspension cylinder is connected to or supported on the central housing and a second end of the suspension cylinder is connected to or supported on the suspension control arm.

7. The assembly according to claim 1, wherein the hydraulic suspension components are arranged at different sides of the central housing.

8. The assembly according to claim 1, wherein the central housing has, with respect to a forward driving direction of the vehicle, a front section and a rear section, wherein both hydraulic components are arranged within one of the front section and the rear section.

9. The assembly according to claim 1, further comprising an axle differential disposed within or at least partially disposed within the central housing.

10. The assembly according claim 1, further comprising a drive shaft disposed within or at least partially disposed within the central housing.

11. A hydraulically suspended vehicle axle, comprising:
the assembly according to claim 1; and
at least one suspension link member that is connected to the central housing of the assembly.

* * * * *